R. ERDLE.
SPEED RECORDER.
APPLICATION FILED FEB. 5, 1916.
1,252,102.
Patented Jan. 1, 1918.
2 SHEETS—SHEET 1.
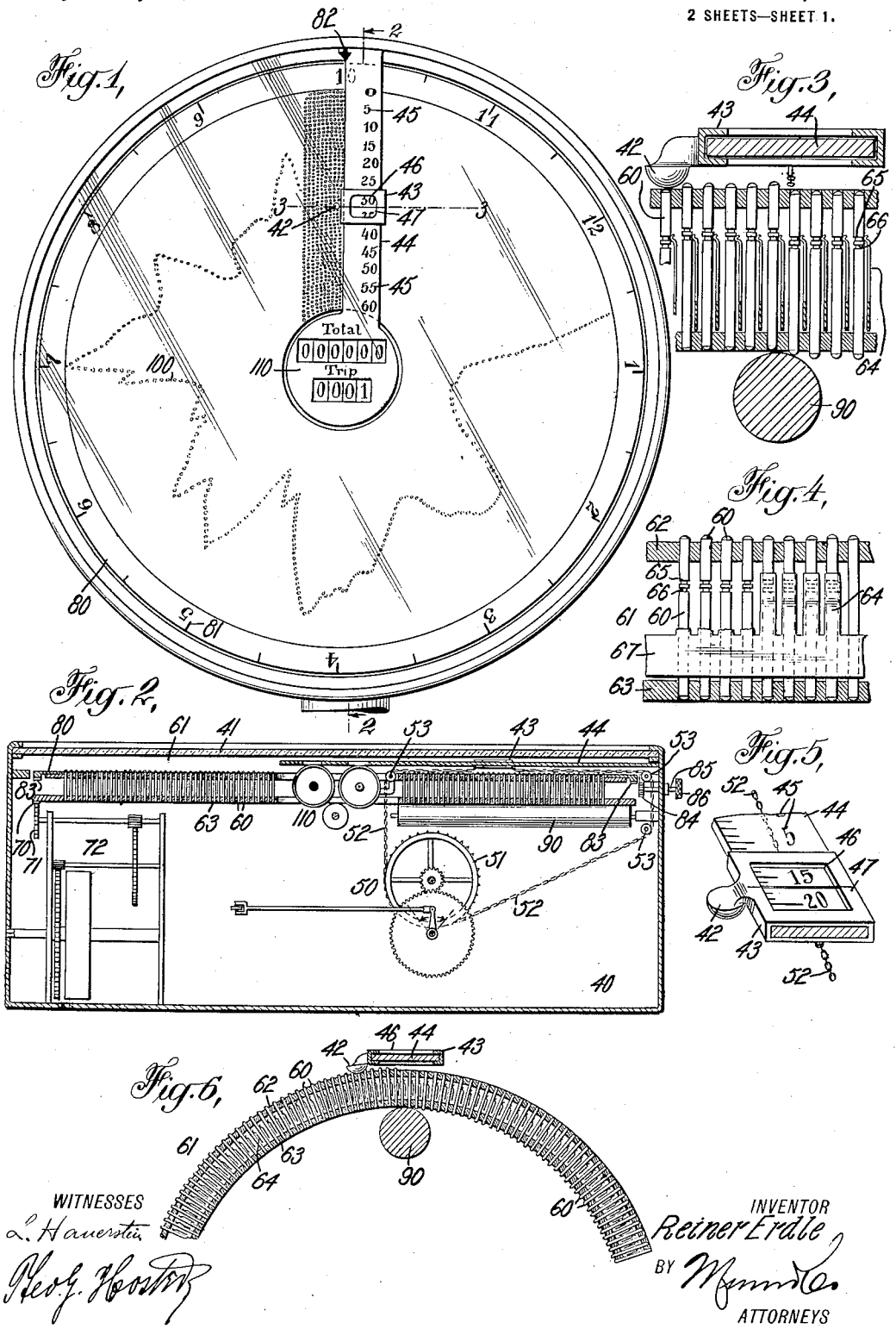
WITNESSES
INVENTOR
Reiner Erdle
BY
ATTORNEYS

R. ERDLE.
SPEED RECORDER.
APPLICATION FILED FEB. 5, 1916.

1,252,102.

Patented Jan. 1, 1918.
2 SHEETS—SHEET 2.

WITNESSES
L. Hauerstein
Geo. J. Wooster

INVENTOR,
Reiner Erdle
BY Munn & Co
ATTORNEYS

UNITED STATES PATENT OFFICE.

REINER ERDLE, OF BROOKLYN, NEW YORK, ASSIGNOR OF ONE-HALF TO HENRY W. SAGAZEI, OF RIDGEFIELD PARK, NEW JERSEY.

SPEED-RECORDER.

1,252,102.

Specification of Letters Patent. Patented Jan. 1, 1918.

Application filed February 5, 1916. Serial No. 76,400.

*To all whom it may concern:*

Be it known that I, REINER ERDLE, a subject of the German Emperor, and a resident of the city of New York, borough of Brooklyn, in the county of Kings and State of New York, have invented a new and Improved Speed - Recorder, of which the following is a full, clear, and exact description.

The invention relates to speed recorders having a clock driven member and a finger marking on the peripheral face of the said member and controlled by the speed of the vehicle, machine or other device on which the speed recorder is used.

The object of the invention is to provide a new and improved speed recorder in which the record made by the finger on the clock driven member is rendered visible for a certain length of time and then obliterated to restore the indicating means to normal blank condition, thus continually presenting anew the indicating means to the action of the finger as the clock driven member is caused to travel thus dispensing entirely with the paper record blanks now generally used and requiring no opening of the speed recorder for the removal of the record produced and substitution of a new record blank.

In order to accomplish the desired result, use is made of a driven member provided with blank record indicating means, a finger engaging the said blank record indicating means to produce a visible record, and means to obliterate the said record and restore the indicating means to normal blank condition prior to again reaching the finger.

A practical embodiment of the invention is represented in the accompanying drawings forming a part of this specification, in which similar characters of reference indicate corresponding parts in all the views.

Figure 1 is a plan view of the speed recorder;

Fig. 2 is a transverse section of the same on the line 2—2 of Fig. 1;

Fig. 3 is an enlarged sectional side elevation of the finger and indicating means, the section being on the line 3—3 of Fig. 1;

Fig. 4 is a transverse section of the same;

Fig. 5 is a perspective view of the stylus and the distance indicating bar on which the finger is mounted to slide;

Fig. 6 is an enlarged sectional side elevation of a modified form of the traveling member, the finger, and the means for restoring the indicating means and obliterating the record;

Figure 7:
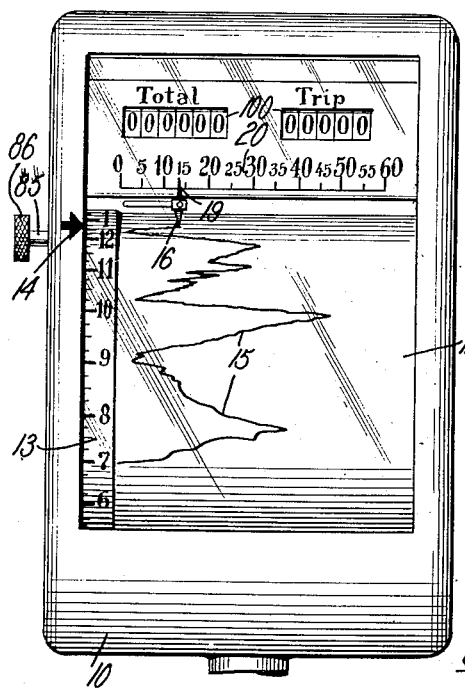
Fig. 7 is a front elevation of a speed recorder of modified form.

The speed recorder illustrated in Figs. 1 to 5 is mounted in a suitably constructed casing 40 provided on the top with a glass cover 41 through which is seen a finger 42 provided with a slide 43 slidingly engaging a distance bar 44 attached to the casing 40 and extending under the cover 41. The distance bar 44 is provided with a distance graduation 45 indicating miles and subdivisions or other standard linear measurement, and the graduation is visible through an opening 46 formed in the slide 43, the latter having an indicating mark 47 directly opposite the finger 42 to correctly indicate the speed in miles at which the vehicle is traveling at the time.

The finger 42 is controlled by a speedometer 50 of any approved construction and connected by a flexible shaft or other means with a movable part of the vehicle, machine or other device on which the speed recorder is used. The speedometer 50 drives a sprocket wheel 51 around which passes a sprocket chain 52 passing over guide rollers 53 to connect at its ends with the slide 43 to move the latter on the distance bar 44 with a view to indicate the miles at which the vehicle is traveling at the time.

Figure 8:
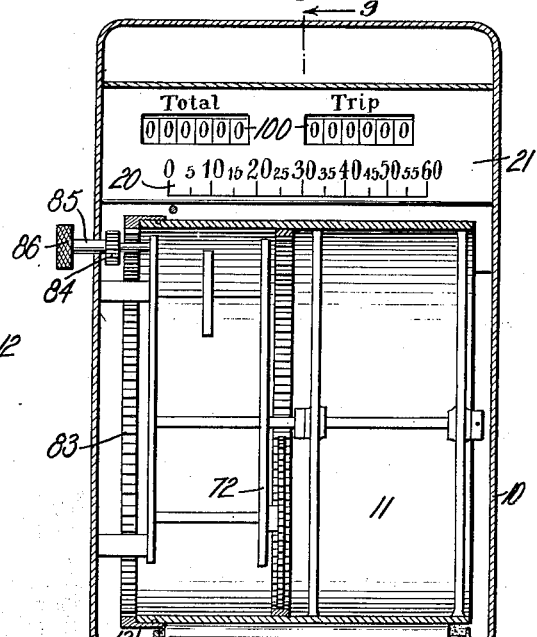
Fig. 8 is a sectional front elevation of the same on the line 8—8 of Fig. 9.
Figure 9:
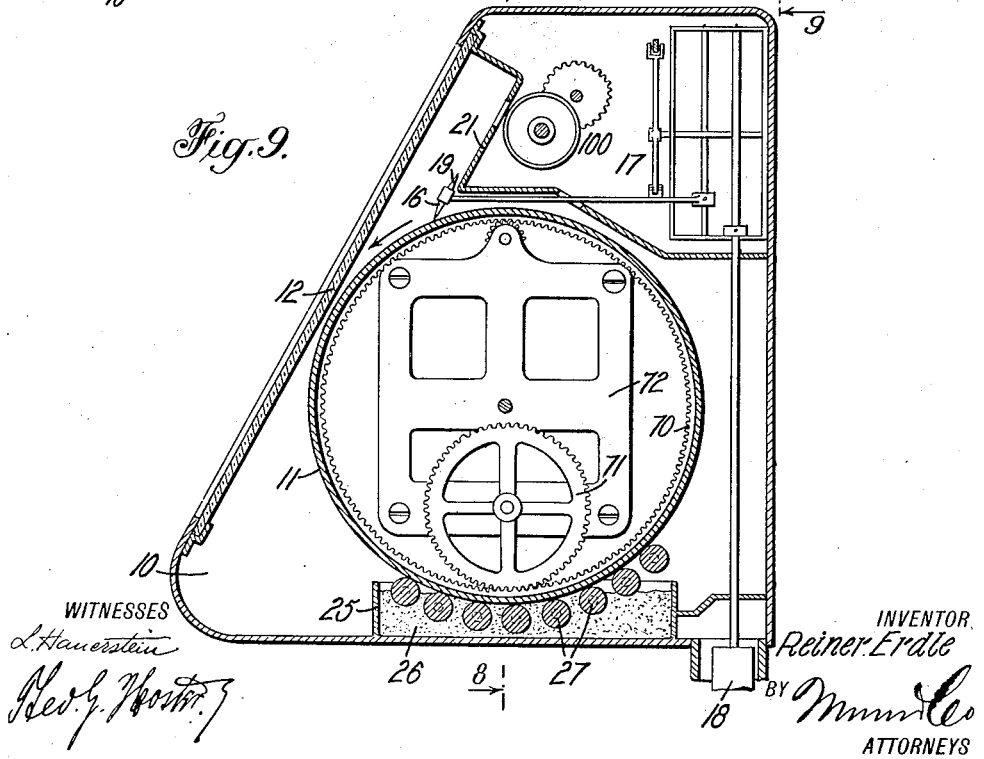
Fig. 9 is a transverse section of the same on the line 9—9 of Fig. 8.

The finger 42 is practically made semi-spherical and is adapted to engage the upper ends of pins 60 shiftably mounted on a clock driven member 61 which may be in the form of a disk as illustrated in Fig. 2, or in the form of a cylinder as indicated in Fig. 6, or in the shape of a drum as illustrated in Figs. 7, 8 and 9. The clock driven member 61, as shown in Figs. 2, 3 and 4, consists of a top disk 62 and a bottom disk 63 in which the pins 60 are slidable in an up and down direction. The pins 60 normally project above the top surface of the upper disk 62 so as to be in the path of the finger 42 to allow the latter to depress the pin moving into the path of the finger during the rotation of the movable member 61. Each of the pins 60 is held in either of its uppermost or lowermost positions by a spring 64 adapted to engage with its free end either of two grooves 65 or 66 formed in the pin intermediate the ends thereof, as will be readily understood by reference to Figs. 3 and 4. The several springs 64 for each row of pins 60 are attached to a single base piece 67 fastened at its ends to the bottom disk 63.

The clock driven member 61 is provided at the under side of the disk 63 and near the periphery thereof with a gear wheel 70 in mesh with a gear wheel 71 forming part of a clockwork 72 for rotating the driven member 61. The upper disk 62 of the clock driven member 61 is provided with a time dial 80 having a graduation 81 indicating hours and subdivisions, and a pointer 82 is fixed on the bar 44 to indicate the time at which the finger 42 acts on a corresponding pin 60 and depresses the same as previously explained. The under side of the dial 80 is provided with a gear wheel 83 adapted to be engaged by a pinion 84 secured on a shaft 85 journaled in the casing 40 and extending to the outside thereof. The shaft 85 is slidable in the direction of its axis and is provided at its outer end with a knurled head or handle 86 under the control of the operator for moving the shaft 85 inward or outward. Normally the shaft 85 is in an outer position with the pinion 84 out of engagement with the gear wheel 83, but when it is desired to set the driven member 61 to the correct time of the day (or night) then the operator pushes the head 86 inward to engage the pinion 84 with the gear wheel 83 after which the operator turns the head 86 to turn the dial 80 on the disk 62 until the time of the day is indicated by the pointer 82. When this has been done the head 86 is pulled outward to disengage the said pinion 84 from the gear wheel 83 to allow the movable member 61 to be driven by the clockwork 72.

A roller 90 is journaled in the casing 40 immediately below the under side of the disk 63 and ranging below the bar 44 so that the lower ends of the depressed pins 60 come in contact with the top of the roller 90 to push the depressed pins back into uppermost position to move the pins again into the path of the finger 42 to be depressed by the latter as previously explained (see Figs. 2 and 3).

When the speed recorder is in use and running then the finger 42 is shifted on the bar 44 according to the speed of the vehicle or other device on which the speed recorder is used, and the finger 42 depresses corresponding pins 60 which are in the path of the said finger. The depressed pins 60 are readily distinguished from the adjacent non-pressed pins whereby a visible record 100 is formed on the face of the movable member 61, as indicated in Fig. 1, the record indicating the speed of the vehicle at any given time of the day and is clearly visible by the observer. When the depressed pins reach the roller 90 they are returned to uppermost position, that is, the record 100 is obliterated and the pins are again in position to be depressed by the finger 42 as soon as they come into the path of the said finger. A counter 110 of any approved construction is mounted on the inner end of the bar 44 and is controlled by the driven member 51 to indicate the miles of a single trip and the total miles used for any given period.

The speed recorder shown in Figs. 7, 8 and 9 is mounted in a suitably constructed casing 10 within which is journaled a clock driven drum 11, of which the front of its peripheral face is visible through a glass-covered opening 12 arranged in the front of the casing 10. The drum 11 is provided at one side of its peripheral face with an adjustable time dial 13 indicating the hours of the day and subdivisions thereof, and time is indicated thereon by a pointer 14 fixed on the front of the casing 10 adjacent one side of the opening 12 next to the dial 13, as will be readily understood by reference to Fig. 7. By the arrangement described, the pointer indicates the time of the day.

The peripheral face of the drum 11 is coated with a suitable substance, such, for instance, as carbon dust or the like, and on this coating is traced a line 15 by the use of a tracer or stylus 16 located at the top front portion of the drum, as plainly shown in the drawings. The tracer 16 is controlled by a speedometer 17 preferably mounted within the casing 10 and of any approved construction. The speedometer 17 is driven by a flexible shaft 18 or other means from a movable part of the vehicle, machine or other device on which the speed recorder is used. The tracer 16 is provided with an upward extension 19 indicating on a distance graduation 20 marked on a plate 21 arranged within the casing 10 above the top of the drum 11. As shown in Fig. 7, the graduation 20 indicates miles and consequently the user of the speed recorder can readily read the number of miles at which the vehicle is traveling. It will also be noticed that the time at which the record is made is readily seen at the time dial 13.

In order to cover up the traced line 15 at the time after the same disappears from view through the opening 12 and to provide a fresh peripheral surface for the tracer 16 to mark on, use is made of a receptacle 25 arranged on the bottom of the casing 10 and containing a coating substance 26, such as carbon dust or the like. In the receptacle 25 are journaled a number of applying and distributing rollers 27 in contact with the peripheral face of the drum 11 so that when the drum is rotated by its clockwork a rotary motion is given to the rollers 27 and the latter apply the coating substance 26 to the peripheral face of the drum 11.

From the foregoing it will be seen that the traced line 15 after, say seven or eight hours, is covered up by the substance 26 held in the receptacle 25 and into which projects the lower portion of the drum 11, the substance being preferably applied and distributed on the peripheral face of the drum 11 by the rollers 27, as before explained.

From the foregoing it will also be seen that blank paper records are entirely dispensed with and the speed recorder need not be opened for the removal of a record and its substitution of another blank.

Having thus described my invention, I claim as new and desire to secure by Letters Patent:

1. A speed recorder, comprising a rotatable member provided with movable members normally projecting above its surface, means for depressing sundry of the said movable members, whereby to produce a visible record, and means for returning the depressed members to normal position.

2. A speed recorder, comprising a rotatable member provided with movable members normally projecting above its surface, a member controlled by the speedometer and movable across the surface of the rotatable member for depressing the movable members lying in its path, and means for returning the depressed members to normal position.

3. A speed recorder, comprising a clock driven member provided with vertically movable pins arranged in close relation to each other, means for holding the pins in a raised or lowered position, a finger movable across the said surface and controlled by a speedometer, the finger engaging the pins moving into the path of the finger to lower such pins relatively to the pins out of reach of the finger to produce a visible record, and means for returning the shifted pins to normal position thus obliterating the record prior to the pins reaching the path of the finger.

4. A speed recorder, comprising a clock driven member provided with movable pins arranged in close relation to each other, a finger movable across the said surface and controlled by a speedometer, the finger engaging the pins moving into the path of the finger to shift such pins relatively to the pins out of reach of the finger to produce a visible record, means for holding the pins in either of the two positions, and a fixed means for returning the shifted pins to normal position thus obliterating the record prior to the pins reaching the path of the finger.

5. A speed recorder, comprising a clock driven member provided with movable pins arranged in close relation to each other, a finger movable across the said surface and controlled by a speedometer, the finger engaging the pins moving into the path of the finger to shift such pins relatively to the pins out of reach of the finger to produce a visible record, a distance indicator on which moves the said finger, means for holding the pins in either of two positions, and means for returning the shifted pins to normal position thus obliterating the record prior to the pins reaching the path of the finger.

6. A speed recorder, comprising a rotatable disk-like member provided with vertically slidable pins, means for holding the pins raised or lowered, a time dial on the rotatable member, a distance indicator bar having a pointer, a slide mounted on the distance indicator bar and controlled by the speedometer, said slide being provided with a finger for depressing the pins lying in its path, and means for returning the pins to normal position.

7. In a speed recorder, a rotatable disk-like member provided with movable members, a slide movable across the face of the said member and provided with a finger for engaging the movable members and to move them to produce a visible record, a speedometer, a sprocket wheel driven by the speedometer, a chain passing around the sprocket wheel and having its ends connected with the said slide, and means for returning the movable members to normal position.

8. In a speed recorder, a rotatable disk-like member provided with movable members, a time dial on the upper face of the rotatable member, means for adjusting the rotatable member, a distance indicator bar above the rotatable member and provided with a pointer, a finger mounted to slide on the said bar and operated by the speedometer for operating the movable members to produce a record, and means for returning the movable members to normal position.

In testimony whereof I have signed my name to this specification in the presence of two subscribing witnesses.

REINER ERDLE.

Witnesses:
   Theo. G. Hoster,
   Philip D. Rollhaus.